United States Patent [19]

Izumi et al.

[11] Patent Number: 4,725,977
[45] Date of Patent: * Feb. 16, 1988

[54] CARTRIDGE PROGRAMMING SYSTEM AND METHOD USING A CENTRAL AND LOCAL PROGRAM LIBRARY

[75] Inventors: Hideki D. Izumi, Saratoga; Devender R. Beravol, Santa Clara, both of Calif.

[73] Assignee: CPT, Ltd., Menlo Park, Calif.

[ * ] Notice: The portion of the term of this patent subsequent to Jun. 24, 2003 has been disclaimed.

[21] Appl. No.: 834,665

[22] Filed: Feb. 28, 1986

Related U.S. Application Data

[63] Continuation of Ser. No. 500,657, Jun. 3, 1983, Pat. No. 4,597,058, which is a continuation-in-part of Ser. No. 493,000, May 9, 1983, abandoned.

[51] Int. Cl.$^4$ .......................... G06F 3/00; G06F 15/21
[52] U.S. Cl. ........................................ 364/900; 364/479
[58] Field of Search ... 364/200 MS File, 900 MS File, 364/479, 410; 369/30, 69; 235/380, 381; 273/1 E, DIG. 28

[56] References Cited

U.S. PATENT DOCUMENTS

| | | | |
|---|---|---|---|
| 3,609,227 | 9/1971 | Kuljian | 360/69 |
| 3,718,906 | 2/1973 | Lightner | 360/69 |
| 3,744,031 | 7/1973 | Avery | 364/200 |
| 3,990,710 | 11/1976 | Hughes | 369/30 |
| 4,186,438 | 1/1980 | Benson | 364/200 |
| 4,247,106 | 1/1981 | Jeffers | 364/410 |
| 4,300,040 | 11/1981 | Gould | 235/380 |
| 4,335,809 | 6/1982 | Wain | 364/900 |
| 4,359,631 | 11/1982 | Lockwood et al. | 235/381 |
| 4,414,467 | 11/1983 | Gould | 273/1 E |
| 4,528,643 | 7/1985 | Freeny, Jr. | 364/900 |
| 4,593,376 | 6/1986 | Volk | 364/479 |
| 4,597,058 | 6/1986 | Izumi et al. | 364/479 |
| 4,654,799 | 3/1987 | Ogaki et al. | 364/479 |
| 4,672,554 | 6/1987 | Ogaki | 364/410 |
| 4,674,055 | 6/1987 | Ogaki et al. | 364/479 |

FOREIGN PATENT DOCUMENTS

| | | |
|---|---|---|
| 49-42255 | 4/1974 | Japan . |
| 53-143299 | 12/1978 | Japan . |
| 54-102843 | 8/1979 | Japan . |
| 2022884A | 12/1979 | United Kingdom . |
| 2079996A | 1/1982 | United Kingdom . |

OTHER PUBLICATIONS

IBM Technical Disclosure Bulletin, vol. 22, No. 10, Mar. 1980, J. A. Aiken, Jr., "Configuration-Sensitive Programme Load", pp. 4351-4352.

Primary Examiner—Raulfe B. Zache
Assistant Examiner—Florin Munteanu
Attorney, Agent, or Firm—Flehr, Hohbach, Test, Albritton & Herbert

[57] ABSTRACT

A cartridge programming system is provided for loading selected computer programs into a reprogrammable plug-in cartridge memory. A host computer controls a plurality of remote programming terminals. The terminals contain a library of programs. The consumer can select one and have it loaded into a blank cartridge. The terminal verifies the integrity of the copy and records the transaction. The host can send new programs to the terminals via dial-up telephone lines in response to the selection of a program not present in a particular terminal program library or in order to update the library of programs at each terminal and can request data on copying-transactions. Various security measures help assure accurate accounting of copies made, thereby assuring authors and their assignees that proper royalties can be billed.

10 Claims, 3 Drawing Figures

CARTRIDGE PROGRAMMING SYSTEM AND METHOD USING A CENTRAL AND LOCAL PROGRAM LIBRARY

This is a continuation of application Ser. No. 500,657 filed June 3, 1983, now U.S. Pat. No. 4,597,058 which was a continuation in part of application Ser. No. 493,000 filed 5/9/83, now abandoned.

This application is related to a patent application entitled Reprogrammable Cartridge Memory and Method, Ser. No. 476,383, filed Mar. 17, 1983, now abandoned, assigned to the assignee of this invention, which is hereby incorporated by reference.

BACKGROUND OF THE INVENTION

This invention relates generally to computer memory devices and more particularly the invention relates to an apparatus and method for programming reprogrammable plug-in cartridge memories.

Plug-in cartridge memories are generally used in calculators and personal computers to provide a greater variety of software than the owners of such computers could otherwise have convenient access to. Conventionally, the software is permanently imbedded in semiconductor chips, which are housed in a cartridge. Any one of a library of programs can be run in the computer by inserting a selected program cartridge into a receptacle in the computer designed for this purpose. Accordingly, users have had to maintain a number of cartridges equal to the programs in his library.

Further, the computer cartridge memory retailers have had to maintain a sizeable inventory of programmed cartridges to satisfy the growing needs of personal computer users.

The present invention is directed to an apparatus for retaining a library of programs and for selectively loading these programs into reprogrammable cartridge memories. Thus, rather than maintaining a physically large collection of cartridges, a user can have a small number of cartridges which can be reprogrammed as desired. Importantly, the retailer can dispense with maintaining a large inventory of permanently programmed cartridge memories. Using the disclosed cartridge programming system the retailer can have any program selected by a customer loaded into a blank cartridge from a library of such programs. The user may either purchase a blank cartridge or provide his own reprogrammable cartridge memory for loading of the desired program.

A preferred embodiment of the present invention includes a combination of security measures and an electronic accounting system for ensuring accurate accounting of all copies made of each program, thereby assuring authors and other interested parties that proper royalties can be billed.

Accordingly, an object of the invention is to provide an improved cartridge programming system and method for storing a library of programs and for loading a selected program or set of programs onto reprogrammable cartridge memories.

Another object of the invention is to provide a method of maintaining a program library without requiring a large inventory of memory cartridges.

A further object of the invention is to provide a system for programming a cartridge memory without removing the semiconductor memory chip from the cartridge.

SUMMARY OF THE INVENTION

In one embodiment, there is provided a cartridge programming system having a host computer which communicates with and controls a plurality of remote programming terminals (RPTs). RPTs are designed to be able to load selected computer programs (selected from a library or contained in another cartridge) onto blank reprogrammable cartridges for a variety of computer systems. Each RPT has a modem for receiving and transfering data between the host and RPT. The RPT has a central processing means (CPM) with an operating system for controlling the functions of the RPT. There is a disk storage device for retaining a library of programs and a battery back-up memory for retaining a record of transactions performed by the RPT. A keyboard is used to select a program to be loaded into the cartridge and to initiate the loading. A cartridge receptacle couples the cartridge to the other components of the RPT.

The invention and objects and features thereof will be more readily apparent from the following detailed description and appended claims when taken with the drawings, in which:

DESCRIPTION OF THE PREFERRED EMBODIMENT

The terms plug-in cartridge memory module, cartridge memory, cartridge, and plug-in memory module are used interchangeably herein and generally refer to any apparatus including cartridge housing means, memory means in the cartridge housing means and connector means at least partially in the cartridge housing means for coupling the memory means to a computer apparatus. Cartridge memory means typically comprise either electrically programmable, ultraviolet light erasable, read only memory (EPROM), or electrically programmable, electrically erasable, read only memory (EEPROM).

The terms program and software are used herein to refer to two distinct sets or types of computer programs. While these terms are normally interchangeable, they are used distinctly here for pedagogical purposes. Thus the computer programs which comprise elements of the invention will be called software means. These control the operation of the host computer and the remote programming terminals. The term programs, on the other hand will be used to refer to the data retained in the host and remote programming terminals for transfer to plug-in cartridge memory modules in accordance with the method of the present invention. In this context programs include all types of computer programs and data which can be usefully retained in a cartridge memory. Typical applications are programs for home video games, educational computer programs, special purpose data sets such as a telephone directory, or statistics on all the players and teams of a particular professional sports league, and other computer programs and data sets whose expected usefulness to the cartridge owner is of limited duration.

Figure 1:
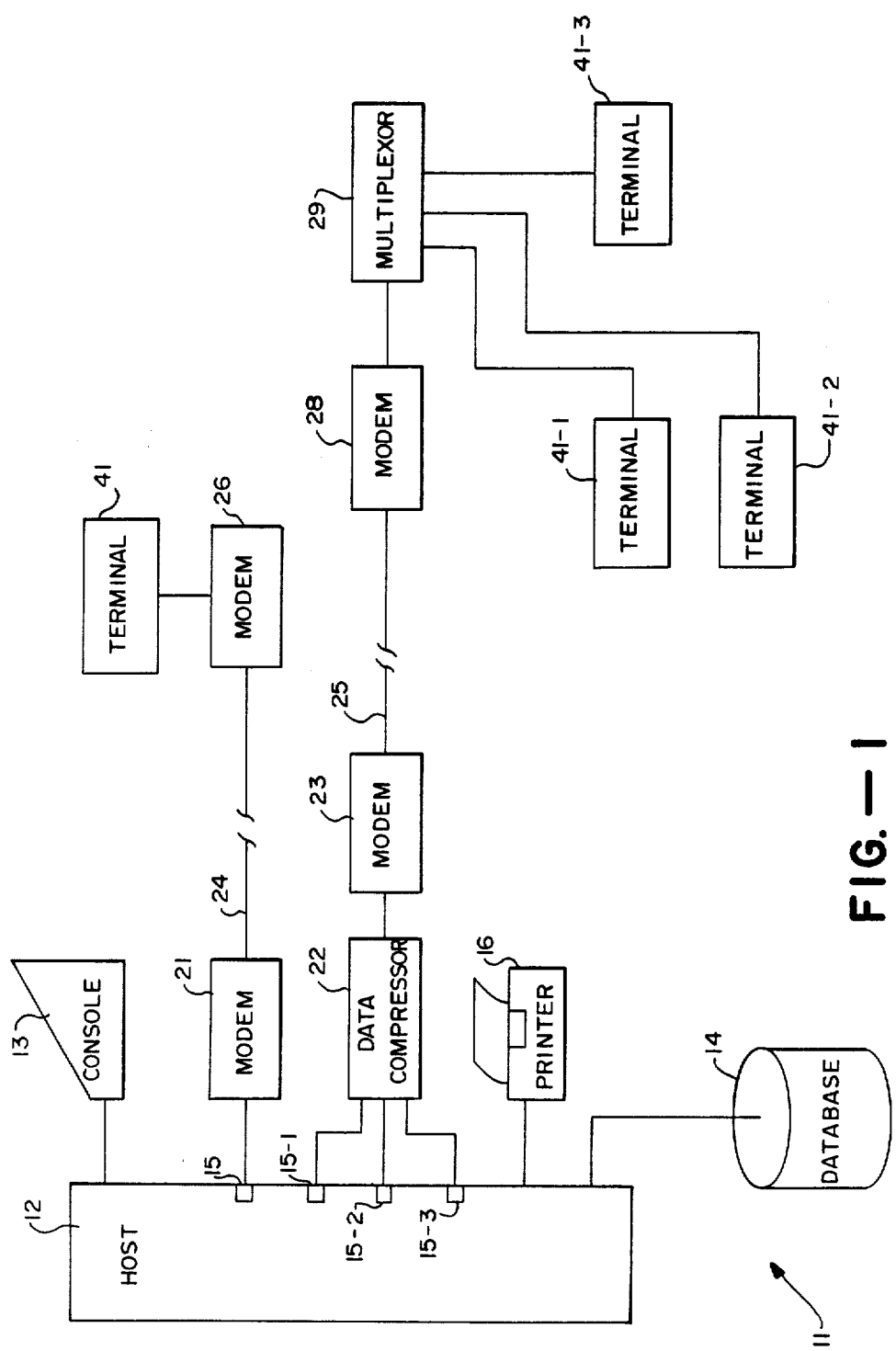
FIG. 1 depicts a functional block diagram of a cartridge programming system including a host computer and several remote programming terminals.

Referring now to FIG. 1, the cartridge programming system 11 is controlled by a host computer 12. Host 12 can be any minicomputer or other data processing system capable of handling the peripheral devices described below. Operation of the host 12 is initiated by use of console 13. Reports and other printed matter can be generated by the host 12 on a printer 16. A data base 14 of programs is maintained in a mass storage medium such as magnetic disks or magnetic tape. Further the host has a plurality of input-output (I/O) ports 15 which are connected to modems 21 for communication with remote programming terminals (RPTs) 41. In one embodiment, each host 12 can support four to sixty-four I/O ports 15. Additional ports 15 can be supported by providing additional host systems 12 or by multiplexing each port 15 to multiple modems 21. Multiple ports 15 can communicate through a single pair of modems 23 in conjunction with a data compressor/multiplexor 22 and 29 at each end. Single-port modems 21 typically operate in conjunction with an ordinary telephone line 24 for communication to an RPT 41 through a corresponding modem 26 on the RPT side of the telephone line. Multiple ports 15-1, 15-2, 15-3 can communicate to corresponding terminals 41-1, 41-2, 41-3 through a single pair of modems 23 and 28 by using data compressor/multiplexors 23 and 29 at each end of the communication line 25. The data compressor/multiplexors 23 and 29 compress multiple transmissions onto a single line, decode compressed signals and direct the decoded data to the proper RPT 41 or port 15. The higher bandwidth requirements of a multiple-port modem 23 may require the use of a dedicated line 25 for communication with the RPTs 41.

Generally, the host 12 operates by dialing up the RPTs 41, using automatic dialing features common in modems 21, and establishing the identity of the RPT 41. The library of programs stored in the RPT may then be updated through a series of commands and by the transmission of new programs to the RPT 41. In addition the host 12 can request and process a record of all program-copying transactions performed by the RPT 41 since the last such communication. Furthermore, the host 12 can respond to calls initiated by an RPT 41 where, for example, the RPT 41 requests that the host download a specific program not in the RPT's library.

Figure 2:
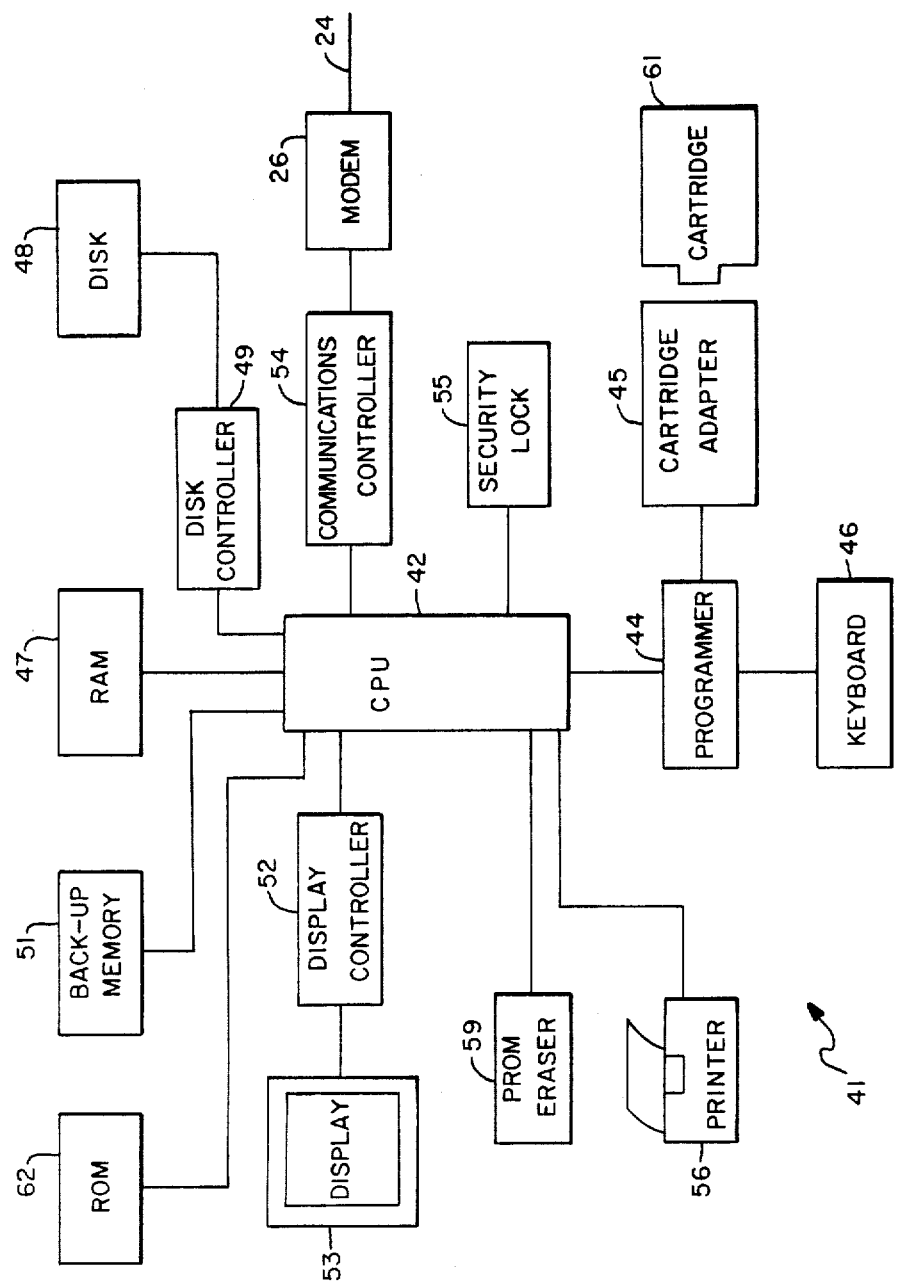
FIG. 2 depicts a functional block diagram of a remote programming terminal.

Referring to FIG. 2, each remote programming terminal (RPT) 41 is controlled by a central processing unit (CPU) 42, typically an Intel 8088 16-bit microprocessor. A library of programs are stored in a set of floppy disks which are accessed by floppy disk drives 48 in conjunction with a disk controller 49, typically an Intel 8272 or NEC 765 floppy disk controller. Memory means include both non-volatile memory 62 for retaining an operating system and volatile random access memory 47 for general use by the CPU 42. Back-up memory 51 is a battery backed up random access memory or bubble memory for storing a record of copying transactions by the RPT 41. Battery back-up means prevents loss of data if the RPT 41 is cut off from its normal power supply. A cartridge adapter 45 provides a receptacle for coupling cartridges to the RPT 41.

In the preferred embodiment cartridge adapter 45 includes a set of nine distinct cartridge slots and a programmable power supply. Each cartridge slot has edge connector means adapted to receive the cartridge memory associated with a particular computer model or set of computer models using similar cartridges. For convenience each slot is labeled with the name of the computer model(s) whose cartridge is compatible with the slot's edge connector. The programmable power supply in this embodiment can supply any voltage between 4.9 and 26 volts, under the direction of the CPU 42, as required to program the particular model of EPROM used in the cartridge to be programmed. Thus, a single RPT can be used to record and sell programs for a large number of distinct computer models with incompatible cartridge designs and even with a variety of EPROMs having different programming voltage requirements.

A programmer interface 44 buffers the cartridge adapter 45 and a keyboard 46 from the CPU 42. The keyboard 46 is used to select the program or programs in the library disks 48 or memory 47 to be loaded into a cartridge 61, and for initiating the loading operation. (In the preferred embodiment a copy of a small number of the most popular programs in the RPT library is kept in random access memory 47 to reduce the time required for completing the most frequent cartridge loading transactions.) The keyboard 46, in conjunction with the modem's automatic dialing feature, can also be used to send messages to the host 12 to request the transmission of a specific program not in the RPT's library, to order new cartridges to replenish the retailer's inventory, or to send a message to the host 12 regarding maintenance problems. A display 53, in conjunction with a display controller 52, provides visual assistance and confirmation of commands given at the keyboard 46. A printer 56 is optionally provided for printing compilations of transactional data.

A security lock 55 prevents use of the RPT 41 by persons not having a key to the system. Modem 26 operates in conjunction with a communications controller 54, typically an Intel 8274 or NEC MPP 7201 device for converting serial data to data usable by the CPU 42, for communication with the host computer 12 over a telephone line 24. As is well known in the art, modems 26 convert digital signals into analogue signals for telephone line transmission and reconvert transmitted analogue telephone line signals back into digital form. Communications controllers 54 convert the serial digital signals from the modem 26 into a parallel format acceptable to the CPU 42 and convert CPU 42 parallel signals into serial format for transmission by the modem 26. Finally, a programmable read only memory (EPROM) eraser 59 may be provided for exposing the EPROM in a cartridge 61 to intense ultraviolet light to erase the contents of the EPROM (where the cartridge memory means is an EEPROM the programmer 44 will be used to accomplish erasing electrically).

Figure 3:
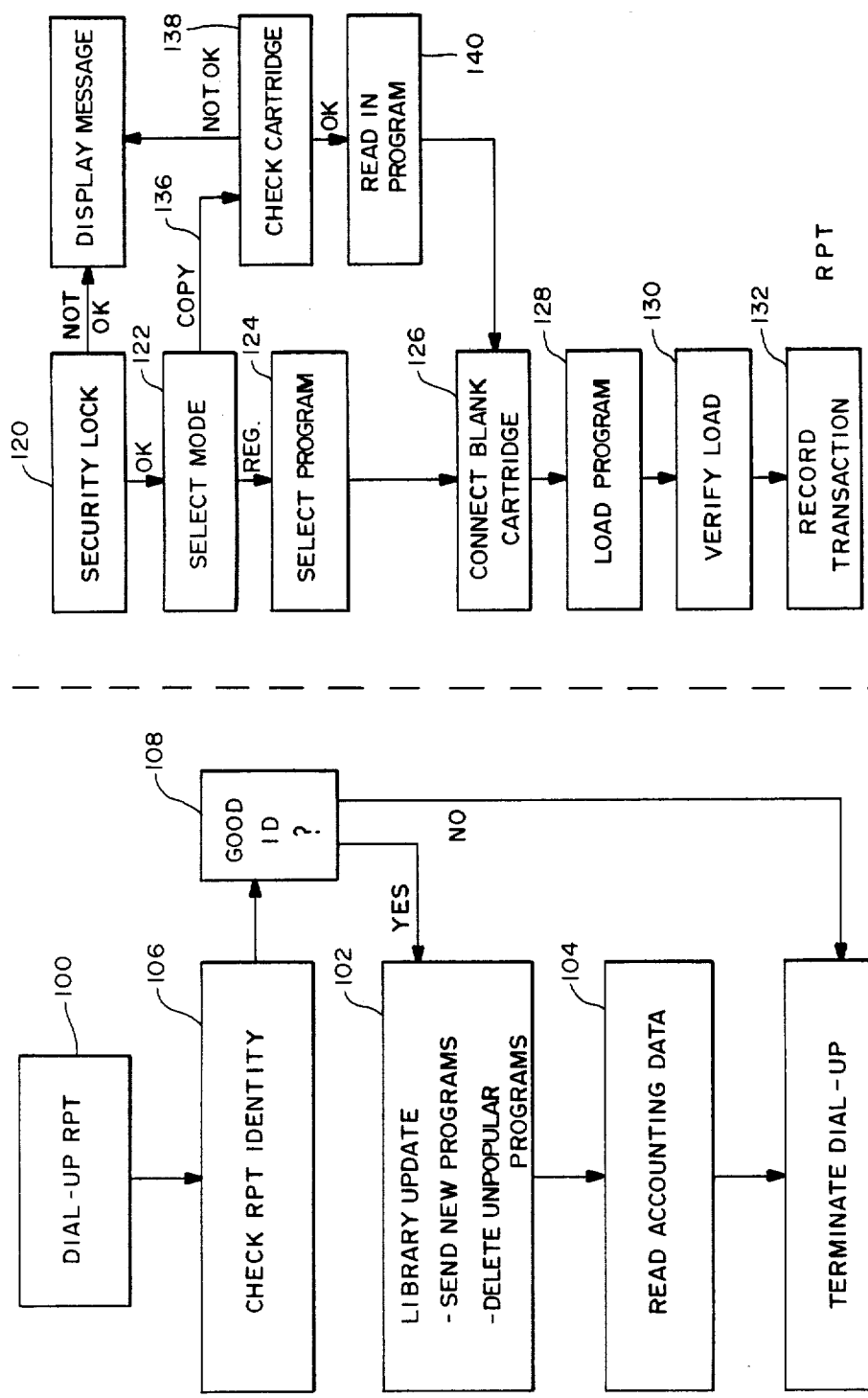
FIG. 3 is a flowchart of the operation of the cartridge programming system.

Referring now to FIGS. 1, 2 and 3, the cartridge programming system works as follows. For each host system 12 a plurality of RPTs 41 are located in retail outlets. The host 12 and RPTs 41 communicate on an occasional basis via normal dial-up telephone lines (see box 100 in FIG. 3). On such occasions the host can delete old programs from the RPT's library, transfer new programs to it, and gather data on transactions at the particular RPT 41 since the last such communication (see boxes 102 and 104 in FIG. 3). Programs are typically transmitted to the RPT 41 with error correcting encoding to help ensure data integrity. Encryption of the transmitted programs can be used to help deter unauthorized copying of the proprietary programs. Similarly the programs in the RPT 41 are stored in a floppy disk library 48 with a file system designed to be incompatible with other computers, thereby deterring unauthorized copying of the library programs.

Further security measures include a proprietary communication protocol 106 and 108 inhibiting unauthorized access to each RPT 41 or host computer 12. Each RPT 41 has a unique internal identifier necessary for establishing communication with the host 12. Finally, the RPT 41 may be designed to receive a down-loaded program from the host 12, specially designed not to work in non-RPT systems, necessary for receiving and storing programs from the host 12.

All the above described security measures are designed to assure that both the author and distributor are informed of all copies made of each program, thereby assuring that proper royalties can be billed. In other words, each part of the system is designed to foil attempts to make unauthorized copies of programs and to ensure that a record of each copy is automatically received by a central host system 12. The operation of the system 11 is thus consistent with preserving the copyrights of authors and their assignees.

At the retail store, operation of the RPT 41 of FIG. 2 is as follows. The user or store employee enables operation of the RPT 41 by putting the proper key into the security lock 55 (see box 120 in FIG. 3). Then a program is selected 122 and 124 from the RAM 47 or the library 48 using the keyboard 46 and display 53 (for visual feedback). A blank cartridge 61 is inserted into the cartridge adapter 45 (see box 126 in FIG. 3). The loading of the program into the cartridge 61 (see box 128 in FIG. 3) is initiated from the keyboard 46 and the cartridge memory is then read (box 130) to verify that a correct copy was recorded in the cartridge 61 memory. A record of the transaction is stored in the battery back-up memory 51 (box 132).

Software means in RPT 41 controls the program selection and loading process. In the preferred embodiment this software means includes a series of menu driven selection routines which, using attractive graphics and simply worded instructions, guide the user through the selection process. Between transactions, the display 53 is kept in an attract mode during which there is displayed, alternately, a short segment from a popular video game, or a preview of several video games or other programs available from the RPT's library, and instructions on how to use the RPT 41. Pushing any key on keyboard 46 initiates display of the first menu. From the first menu the user selects the computer model for which he would like to purchase a program by pushing one or more keys on keyboard 46. For each such computer model the RPT 41 has a library of programs designed to run on that machine.

Next the RPT 41 displays a menu of programs currently available for the computer model selected along with the retail price for loading a copy of each program into a cartridge memory. If the wrong computer model was selected the user can return to the first menu by pushing the proper key on keyboard 46. After the user selects the program he would like to buy (by pushing the proper keys), the display 53 instructs the user to insert a blank cartridge 61 in the proper cartridge slot of cartridge adapter 45. If the wrong program was selected the user can return to the second menu by pushing the proper key on keyboard 46. The RPT 41 then checks that the inserted cartridge is in fact a functional blank cartridge. If the cartridge is functional but not blank, that fact is announced on the display 53, and if the cartridge is defective a message to that effect is displayed. Thus, the RPT 41 can distinguish between defective cartridges and non-defective, non-blank cartridges. A record of defective cartridges is kept for cartridge reliability and quality assurance purposes. After the RPT 41 confirms that a good blank cartridge 61 has been inserted into the proper slot the cartridge memory is loaded with the selected program.

If the customer brings in a programmed cartridge 61 for reprogramming the store may either erase the cartridge 61 in a PROM erasure unit 59 before reprogramming it or exchanging the old cartridge 61 in for a blank one. In the latter circumstance, the programmed cartridge 61 may be erased later, either at the store or at a separate facility. Such a central erasing facility can help keep track of program loading transactions independently of the computerized system described earlier. Before exchanging cartridges 61 the store can plug the cartridge 61 into the RPT 41 and test its integrity, thereby avoiding losses due to the exchange of good cartridges 61 for defective ones.

If the customer wishes to copy a program on one cartridge 61 onto another the RPT 41 can be used to record the program in the first cartridge 61 memory and copy it onto a blank cartridge 61 (see line 136 and boxes 138, 140 and 126 in FIG. 3). The RPT 41 is designed to copy programs from only those cartridges which have sufficient identification of the program to ensure proper accounting of the copying transaction. Thus, programs not in the RPT library can be copied in a manner consistent with copyrights in the programs.

Both the host 12 and RPTs 41 have software means to generate a variety of reports from the transactional data stored in back-up memory 51. The RPT 41 in the preferred embodiment has a printer 56 on which reports can be printed summarizing transactions performed by that particular RPT 41. Daily, weekly and monthly reports can be generated showing which programs were sold most often, which computer models generated the most sales, how many defective cartridges were found, gross receipts on sales, royalties due to the vendor, and other relevant information. RPTs not equipped with printers can display similar reports on the display 53.

The host 12 periodically calls up each RPT 41 and obtains a copy of all the transactional data stored in each RPT's battery back-up memory 51. From this information the host 12 can generate reports of sales by each RPT 41, and the corresponding royalties due to the vendor, sales of each program and the royalties due thereon to the copyright licensors, popularity trends, and other similar types of analyses.

A cartridge programming system in accordance with the invention enables flexibility and economy in use both by the retailer and the computer user. While the system has been described with reference to a specific embodiment, the description is illustrative of the invention and is not to be construed as limiting the invention. For instance, the materials loaded into the cartridge memories may be data rather than computer programs. Various modifications and applications may occur to those skilled in the art without departing from the true spirit and scope of the invention as defined by the appended claims.

What is claimed:

1. In a system for recording computer programs in reprogrammable memories, a multiplicity of recording terminals, each recording terminal comprising:

first memory means for storing a program library comprising a multiplicity of predefined computer programs;

second memory means for retaining transaction data representing the number of times each said predefined computer program has been recorded;

preprogrammed data processing means coupled to said first and second memory means, for controlling the process of selecting one of said predefined computer programs and recording it in a reprogrammable memory, and for storing transaction data in said second memory means representing the number of times each said predefined computer program has been recorded;

command entry means coupled to said preprogrammed data processing means for selecting one of said predefined computer programs, and for initiating the recording of said selected computer program in a reprogrammable memory;

memory receptacle means for coupling a reprogrammable memory to said preprogrammed data processing means so that said selected computer program can be recorded therein; and host communication means for coupling said first and second memory means to a host computer, said host communication means including:

means for sending said transaction data from said second memory means to said host computer so that said host computer can compile data representing the number of times each said predefined computer program has been recorded;

means for receiving selected computer programs from said host computer and for storing said selected computer programs in said first memory means of said recording terminal.

2. A recording terminal as set forth in claim 1 wherein:

said program library includes computer programs for use on a plurality of different computer models, wherein the computer programs for use on at least one of said computer models is not useable on at least one of said other computer models;

said memory receptacle means includes a plurality of distinct receptacles for coupling physically distinct types of reprogrammable memories to said preprogrammed data processing means, wherein at least one of said physically distinct types of reprogrammable memories is useable only with predefined ones of said different computer models;

said recording terminals each further including display means for displaying messages; and said preprogrammed data processing means is programmed to perform the tasks of displaying on said display means a list of the computer programs in said program library which are for use on a specified one of said plurality of different computer models;

in response to signals from said command entry means indicating the selection of one of said computer programs for a specified computer model, checking for the presence in one of said memory receptacles of a reprogrammable memory of a type which is useable with said computer model, and then recording said selected computer program in said reprogrammable memory.

3. A recording terminal as set forth in claim 2 wherein:

in response to signals from said command entry means indicating the selection of one of said computer programs for a specified computer model, said preprogrammed data processing means is further programmed to perform the task of verifying that said reprogrammable memory is ready for the storage of a computer program therein and producing a corresponding message on said display means if it is not ready.

4. A recording terminal as set forth in claim 2 wherein:

said list of computer programs displayed on said display means includes computer programs not in said program library; and in response to signals from said command entry means indicating the selection of one of said computer programs for a specified computer model, said preprogrammed data processing means is further programmed to perform the task of verifying that said selected computer program is in said program library, and if not, using said host communication means to establish a connection with said host computer and to initiate the process of having said host computer send said selected computer program to said recording terminal for storage in said first memory means.

5. A recording terminal as set forth in claim 1 wherein said reprogrammable memory is a memory cartridge; and said preprogrammed data processing means includes means for verifying that said selected computer program has been successfully recorded in said reprogrammable memory.

6. A recording terminal as set forth in claim 1 wherein:

said recording terminal includes display means for displaying messages;

said preprogrammed data processing means is programmed to respond to signals from said command entry means indicating the selection of one of said computer programs for a specified computer model by performing a sequence of steps, including the step of verifying that said reprogrammable memory is ready for the storage of a computer program therein, and producing a corresponding message on said display means if it is not ready; and said preprogrammed data processing means includes means for verifying that said selected computer program has been successfully recorded in said reprogrammable memory.

7. In a system for recording computer programs in reprogrammable memories, a multiplicity of recording terminals, each recording terminal comprising:

first memory means for storing a program library comprising a multiplicity of predefined computer programs;

second memory means for retaining transaction data representing the number of times each said predefined computer program has been recorded;

display means for displaying messages;

preprogrammed data processing means coupled to said first and second memory means, for controlling the process of selecting one of said predefined computer programs and recording it in a reprogrammable memory, for verifying that said selected computer program has been successfully recorded in said reprogrammable memory, and for storing transaction data in said second memory means representing the number of times each said predefined computer program has been recorded;

command entry means coupled to said preprogrammed data processing means for selecting one of said predefined computer programs, and for initiating the recording of said selected computer program in a reprogrammable memory;

memory receptacle means for coupling a reprogrammable memory to said preprogrammed data processing means so that said selected computer program can be recorded therein; and host communication means for coupling said first and second memory means to a host computer, said host communication means including:

means for sending said transaction data from said second memory means to said host computer so that said host computer can compile data representing the number of times each said predefined computer program has been recorded;

means for receiving selected computer programs from said host computer and for storing said selected computer programs in said first memory means of said recording terminal;

wherein said preprogrammed data processing means is programmed to perform the tasks of displaying on said display means a list of the computer programs in said program library; and responding to signals from said command entry means indicating the selection of one of said computer programs by performing the steps of, checking for the presence of a reprogrammable memory in said memory receptacle means, and then recording said selected computer program in said reprogrammable memory.

8. A recording terminal as set forth in claim 7 wherein said list of computer programs displayed on said display means includes computer programs not in said program library; and in response to signals from said command entry means indicating the selection of one of said computer programs for a specified computer model, said preprogrammed data processing means is further programmed to perform the tasks of:

verifying that said selected computer program is in said program library, and if not, (a) using said host communication means to establish a connection with said host computer and initiate the process of having said host computer send said selected computer program to said recording terminal for storage in said first memory means, (b) and then, after said selected computer program has been stored in said first memory means, recording said selected computer program in said reprogrammable memory.

9. A recording terminal as set forth in claim 7 wherein:

said program library includes computer programs for use on a plurality of different computer models, wherein the computer programs for use on at least one of said computer models is not usable on at least one of said other computer models;

said memory receptacle means includes a plurality of distinct receptacles for coupling physically distinct types of reprogrammable memories to said preprogrammed data processing means, wherein at least one of said physically distinct types of reprogrammable memories is usable only with predefined ones of said different computer models;

said recording terminals each further including display means for displaying messages; and said preprogrammed data processing means is programmed to perform the tasks of displaying on said display means a list of the computer programs in said program library which are for use on a specified one of said plurality of different computer models;

in response to signals from said command entry means indicating the selection of one of said computer programs for a specified computer model, checking for the presence in one of said memory receptacles of a reprogrammable memory of a type which is usable with said computer model, and then recording said selected computer program in said reprogrammable memory.

10. A recording terminal as set forth in claim 9 wherein:

said preprogrammed data processing means is programmed to verify that said reprogrammable memory is ready for the storage of a computer program therein, and to produce a corresponding message on said display means if it is not ready.

* * * * *